Jan. 7, 1964    A. M. TAILLEUR    3,117,270
REGULATED POWER SUPPLY DEVICE
Filed Oct. 8, 1959
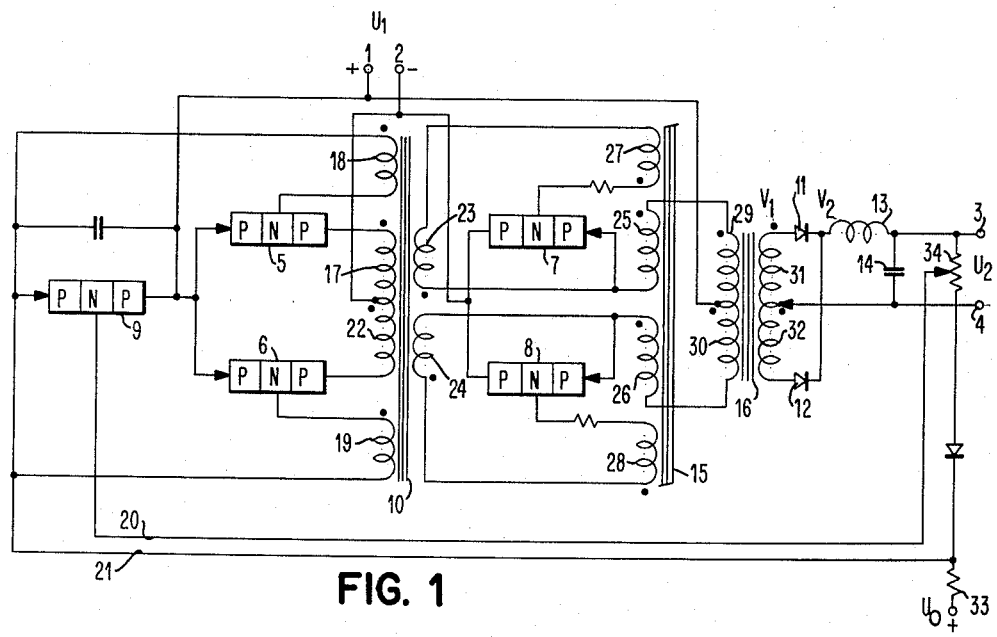
FIG. 1
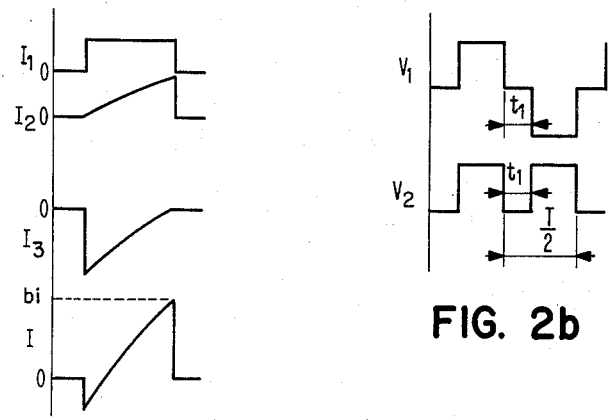
FIG. 2a
FIG. 2b
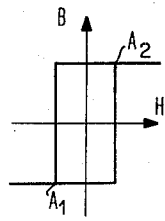
FIG. 3
*INVENTOR*
ANDRE M. TAILLEUR
BY *Francis V. Giolma*
*ATTORNEY*

3,117,270
REGULATED POWER SUPPLY DEVICE
André M. Tailleur, Paris, France, assignor to International
 Business Machines Corporation, New York, N.Y., a
 corporation of New York
Filed Oct. 8, 1959, Ser. No. 845,209
Claims priority, application France Oct. 28, 1958
4 Claims. (Cl. 321—2)

This invention relates to power supply devices and more particularly to transistor devices providing a regulated D.C. voltage from another D.C. voltage.

To get a D.C. voltage from another D.C. voltage, the usual process is to derive from the first D.C. voltage an A.C. voltage, sinusoidal or not, which, after being applied to a transformer, is rectified so as to provide the desired D.C. voltage. The regulation of the output voltage may be made by acting, either on the rectified voltage or on the intermediate A.C. voltage. Affecting the D.C. voltage is disadvantageous in that an often important part of the supplied rectified power is dissipated in the regulated element. Therefore, it will be preferably acted on the intermediate A.C. voltage, so much the more as it is possible to act on low power elements.

There exist two main regulating modes, when acting on the alternating voltage. It may be acted either on the value of that voltage or on the average voltage during an alternance of the output voltage of an element which transmits current only for a fraction of half the period of the A.C. voltage. The variation of that fraction of half the period may be obtained by causing either the conducting time of the regulating element to vary, or the frequency of the A.C. signal, the conducting time of the regulating element being fixed.

The main object of this invention is to provide a new power supply device supplying a D.C. voltage from another D.C. voltage wherein an intermediate A.C. voltage is produced, the frequency of which is fixed by the regulating control.

Another object of the invention is to provide a new power supply device wherein an intermediate square-waved A.C. voltage is obtained by means of a transistor oscillator, the frequency of that A.C. voltage being controlled by the regulating element.

Another object of the invention is to provide a new power supply device wherein the error voltage affects the current derived from a transistor, thus causing the voltage provided by the oscillator to vary.

Another object of the invention is to provide a new power supply device wherein a magnetic element is used to prevent the transmission of a current for a well-determined time.

The foregoing and other objects, features and advantages of the invention will be apparent from the following more particular description of a preferred embodiment of the invention, as illustrated in the accompanying drawings.

In the drawings:

FIG. 1 diagrammatically represents a power supply device built in accordance with the invention.

FIGS. 2a and 2b show curves giving the general aspect of the currents and voltages in various points of the circuit of FIG. 1.

FIG. 3 is a diagram of the hysteresis cycle of a magnetic core used in a supply device in accordance with the invention.

The power supply device represented in FIG. 1 is provided to supply a D.C. voltage $U_2$ across its output terminals 3 and 4 from a D.C. voltage $U_1$ applied between its input terminals 1 and 2. Voltage $U_1$ feeds to a magnetic multivibrator type of oscillator made of two transistors 5 and 6, and to an amplifying unit made of two transistors 7 and 8. A reference voltage $U_0$ allows, by comparison with the output voltage $U_2$, to define an error voltage which affects regulating transistor 9. A substantially linear transformer 10 connects the oscillating stage to the amplifying stage composed of transistors 7 and 8, which in turn connects to diodes 11 and 12 which rectify the square wave output, and a filter comprising inductance 13 and condenser 14, through the windings of a rectangular hysteresis looped magnetic core 15 and transformer 16. The transistors of the device are represented as being of the PNP type, but it is obvious that transistors of the NPN type may as well be used. The dot adjacent to one input of each winding indicates that, if a current is applied to the dotted end of the winding, the magnetic flux appearing in the core is of a determined direction, whatever may be the winding. It results in that, when the current increases in that winding, the dotted end of that winding is at a higher potential than that of the other end of the winding, and that the voltages induced in the other windings are such that, in each one, the potential of the dotted end is higher than that of the other end. The dotted end will be called further on: "input" of the winding, the other end being the "output."

Let is be assumed that, originally, the base of transistor 5 is slightly negative with respect to the emitter of the same transistor, the current will increase in that transistor from the emitter towards the collector, thus causing the input of winding 17 to turn positive with respect to the output. Electromotive forces induced in windings 18 and 19 will then make the inputs positive with respect to the outputs. The result will be, on one hand, an increase of the emitter-base current of transistor 5 and a reverse polarization of the emitter-base junction of transistor 6, which blocks the latter. The increase of the emitter base current of transistor 5 then causes an increase of the collector current. The phenomenon is therefore a positive reaction, and lasts till the saturation of the transistor, that is, if I is the collector current, and i the base current, until $I=bi$, $b$ being the base-collector current gain in the transistor.

The voltage across winding 17 is established instantaneously, thus providing, for the whole duration of this part of the operation, a D.C. voltage across winding 18, which therefore operates to supply emitter-base current to transistors 5 and 6 through transistor 9, which is maintained conductive because of the error voltage existing between leads 20 and 21.

When the saturation current, $I=bi$, is reached, $I$ cannot increase any more, which cancels the induced voltages and causes the current to decrease, which results in inverting the voltages. Consequently, transistor 5 is blocked, and transistor 6 turns conducting. Before it is conducting, the positive voltage appearing at the output of winding 22 provides a negative collector current which decreases in proportion as the conduction of transistor 6 becomes greater; said current turns positve again on another inversion of the phenomenon. The collector current I, on each alternance, may be considered as the sum of three currents:

A current $I_1$ from the load of the transformer which may be considered purely as a resistance, said current has the same aspect as the voltage.

An exponential current $I_2$ due to the inductance of winding 17.

An exponential current $I_3$ from the discharge of the electromagnetic energy stored during the preceding half cycle.

The aspect of these three currents and of the resulting current during half a cycle is given in FIG. 2a.

Let is be referred to the half-cycle during which the voltage is positive at the output of the windings of the transformer, therefore at the output of winding 23.

The voltage across winding 23 is applied between the emitter and base of transistor 7 which operates as an emitter load power amplifier. The emitter current applied to the input of winding 25 on a core 15 will cause the magnetization state of that core to travel from point $A_1$ to point $A_2$ of the hysteresis loop given on FIG. 3. During switching time $t_1$ which depends only upon the characteristics of the core and of winding 25 and is therefore essentially constant, the current is low and equal to the magnetizing current, and all the output voltage of the amplifier is across that winding, whereas a voltage induced across winding 27 opposes the control voltage, in order to limit the emitter-base current. When the saturation induction is reached, the voltage drop is small across winding 25 and all the output voltage is transferred to half the primary winding 29 of transformer 16. On the following half cycle, the voltages are inverted in windings 23 and 24, which blocks transistor 7 and causes transistor 8 to turn conducting. The magnetization state of core 15 returns from point $A_2$ to point $A_1$ during which no voltage appears across windings 31 and 32 as a whole, and rectified voltage $V_2$, therefore have the aspects shown in FIG. 2b.

It is seen therefore that voltage $U_2$ is the average value of voltage $V_2$ when filtered. If T is the period of the voltage provided by the oscillator:

$$U_2 = \frac{\left(\frac{T}{2} - t_1\right) V_2}{\frac{T}{2}}$$

or:

$$U_2 = \left(1 - \frac{2t_1}{T}\right) V_2$$

Since $t_1$ is constant, it is seen that if the period T of the A.C. voltage increases, the filtered voltage increases, and, if it decreases, the filtered voltage decreases.

On the other hand, the described system is self-regulated. For, if the utilization or load impedance decreases, which causes output voltage $U_2$ to decrease; the output impedance of transistors 7 and 8 decreases and their input impedance increases because of the variations in their amplifying coefficient. The result is a diminution in portion $I_1$ of current I and therefore a decrease in current I, which later on reaches the saturation value $bi$; this produces an increase in the period of the alternating wave, so as to increase the output voltage.

To complete the regulation effected by transistor 9, current I is caused to vary by reference voltage $U_0$ applied to terminal 33. This voltage $U_0$ compared to a fraction $\alpha U_2$ of the output voltage $U_2$ collected on potentiometer 34 is used to feed an emitter-base current to transistor 9. It is seen that if the output voltage decreases, voltage $U_0 - \alpha U_2$ increases, and therefore the emitter-base current $i_1$ of transistor 9 increases giving $i = b_1 i_1$, for the emitter-collector current of transistor 9, which is the emitter-base current of each one of transistors 6 and 5, $b_1$ being the base-collector current gain for transistor 9. An increase of $i$ increases the saturation current of transistors 5 and 6, and hence the period of the alternating wave and the output voltage.

While the invention has been particularly shown and described with reference to a preferred embodiment thereof, it will be understood by those skilled in the art that various changes in form and details may be made therein without departing from the spirit and scope of the invention.

What is claimed is:

1. In a power supply device, a square wave output magnetic multivibrator having transistor switch means controlling the saturating current, control switch means operable to vary the emitter-base current of said transistor switch means to vary the frequency of oscillation of said multivibrator, an output circuit including rectifier and filter means, means including a substantially rectangular hystersis loop core transformer connecting the multivibrator output to the output circuit, said transformer operating to vary the effective voltage applied to the output circuit by removing a constant notch in the initial portion of each half of each square wave, and means including a reference source connecting the output circuit to control said control switch means and vary the frequency of the multivibrator for regulating the voltage of the output circuit.

2. In combination, a magnetic multivibrator including a core of magnetic material with windings coupled by transistor switch means for producing a square wave output, an output circuit including rectifier and filter means, means including a rectangular loop core saturable transformer having a plurality of winding at least one of the windings being connected in series with the multivibrator and the output circuit, said means including a transistor amplifier controlled by another of said windings to reduce the effect of the amplifier during the initial portion of each half of each square wave output from the multivibrator to provide a constant notching effect on each square wave and modify the effective output voltage, and circuit means connecting the output circuit to control the base current of the transistor switch means and hence the frequency of oscillation of the multivibrator to regulate the effective voltage of the output circuit.

3. In combination, a magnetic multivibrator having transistor switch means for varying the saturating current and hence time for saturation thereof, an output circuit including rectifier and filter means, means including an amplifier and a saturable rectangular loop core transformer connecting the magnetic multivibrator to the output circuit, said transformer having a winding connected to the amplifier to reduce the effect thereof during saturating of the core to provide a constant notch effect in the initial portion of each half of each square wave, and circuit means including a reference source for varying the emitter-base current of the transistor switch means and hence the frequency of the square wave output to regulate the effective value of output circuit voltage.

4. In a power supply device, a square wave output magnetic multivibrator having transistor switch means controlling the saturating current, control switch means operable to vary the emitter-base current of said transistor switch means to vary the frequency of oscillation of said multivibrator, an output circuit including rectifier and filter means, means including a substantially rectangular hysteresis loop core transformer connecting the multivibrator output to the output circuit, amplifier means connected between the multivibrator and said transformer, circuit means including a winding on the transformer connected to control said amplifier, said transformer winding operating to vary the effective voltage applied to the output circuit by removing a constant notch in the initial portion of each half of each square wave, and means including a reference source connecting the output circuit to control said control switch means and vary the frequency of the multivibrator for regulating the voltage of the output circuit.

References Cited in the file of this patent

UNITED STATES PATENTS

| | | |
|---|---|---|
| 1,891,084 | Fitzgerald | Dec. 13, 1932 |
| 1,952,062 | Fecker | Mar. 27, 1934 |
| 2,070,446 | Mittag | Feb. 9, 1937 |
| 2,305,581 | Homrighous | Dec. 15, 1942 |
| 2,547,162 | Kidd | Apr. 3, 1951 |
| 2,701,333 | Granger | Feb. 1, 1955 |
| 2,783,380 | Bonn | Feb. 26, 1957 |
| 2,783,384 | Bright et al. | Feb. 26, 1957 |
| 2,817,804 | Kurshan | Dec. 24, 1957 |
| 2,959,745 | Grieg | Nov. 8, 1960 |
| 2,983,860 | Todd | May 9, 1961 |
| 2,987,664 | Poirier et al. | June 6, 1961 |
| 2,987,665 | Thompson | June 6, 1961 |

OTHER REFERENCES

"Transistor Power Converters," by Hamlin, CQ, May 1958, pages 42 and 43.